Sept. 14, 1926.
D. HEAD
ARTIFICIAL FISHING BAIT
Filed Feb. 17, 1923
1,599,763
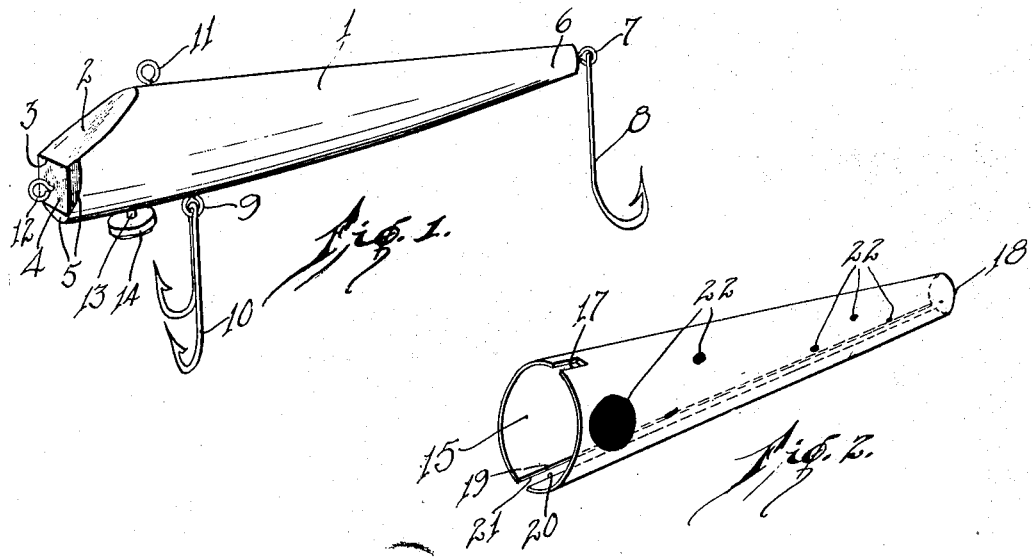
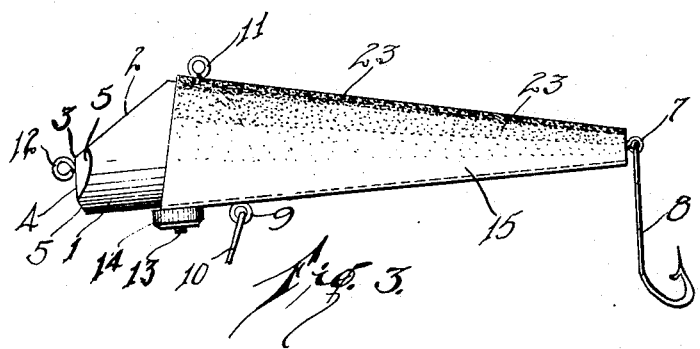
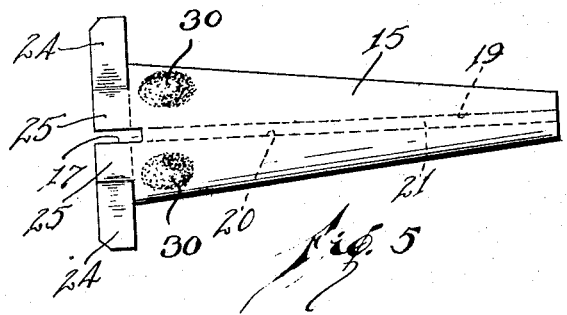
INVENTOR
Drew Head
BY Munn & Co.
ATTORNEYS Patented Sept. 14, 1926.

1,599,763

UNITED STATES PATENT OFFICE.

DREW HEAD, OF SAN ANTONIO, TEXAS.

ARTIFICIAL FISHING BAIT.

Application filed February 17, 1923. Serial No. 619,690.

My invention relates to improvements in artificial fishing baits, and it consists in the combinations, constructions, and arrangements herein described and claimed.

An object of my invention is to provide a bait of the character described in which means is provided for instantly changing the general color and tint of the bait by substituting shells of different colors on the exterior walls of the bait, so that when the fish will not strike or bite at one color, another color may be substituted which will have a greater appeal to the fish.

A further object of my invention is to provide a bait of the character described in which the interchangeable shells are conical in shape, thereby permitting the shells to be nested one within the other so that a large number of the shells may be carried in a relatively small tackle box. This is a most important advantage, since otherwise it would be necessary to employ a separate bait, each of different color, to fulfill the various wants of the expert fisherman.

A further object of my invention is to provide an artificial bait of the character described which is generally termed a surface bait. To this end I construct the metal shell of fine gauge aluminum which permits the bait to float when free from extraneous forces, such as the trolling of the line to which the bait is attached.

A further object of my invention is to provide an artificial bait of the character described which may be used as a suitable under-water bait by merely increasing the thickness of the aluminum shell, or by the substitution of a heavy shell for a light shell where the device was previously used for surface bait, thereby increasing the specific gravity of the entire bait to cause the bait to sink to a greater depth.

A further object of my invention is to provide a bait of the character described in which I provide what I choose to term a primary and secondary line attaching eye. The primary eye is provided adjacent the upper portion of the bait and when the line is attached thereto and trolled, the bait will move with erratic fish-like movement, leaping from the water or diving. The secondary attaching eye is disposed at the forward end of the bait substantially along the axis of the bait and eliminates the darting and diving of the bait. This secondary attaching eye is provided where only a wiggling motion of the bait is desired, and is particularly well adapted for casting among weeds, etc.

A further object of my invention is to provide a device of the character described in which means is provided for securing the shell against accidental lateral displacement on the body portion of the bait.

Other objects and advantages will appear in the following specification, and the novel features of the invention will be particularly pointed out in the appended claims.

My invention is illustrated in the accompanying drawings, forming part of this application, in which—

Figure 1 is a perspective view of an embodiment of my invention with the shell removed, Figure 2 is a perspective view of one of the interchangeable shells arranged to partially envelop the body portion shown in Figure 1, Figure 3 is a side elevation of the mechanism shown in Figure 1 with one of the shells attached, Figure 4 is a plan view with one of the shells before it is finally formed, and Figure 5 is a view of a modified form of the shell.

In carrying out my invention, I make use of a substantially conical body member 1 of wood. I prefer to construct this body member 1 of wood, since then the body member itself may float upon the surface of the water when no extraneous force is applied thereto to cause the movement of the body member.

The body member of the bait 1 is fashioned with a partially truncated portion 2 at its forward end, which end I choose to call the head of the body member. This truncated portion 2 is formed in a flat plane, the forward edge 3 of which is on a substantially horizontal line transverse to the axis of the conical body member 1. The adjacent end 4 of the body member 1 is substantially flat and is disposed in a substantially vertical plane.

The side and lower edge of the surface 4 are beveled, as shown at 5, to preclude the presence of sharp corners by virtue of which the bait might become engaged with weeds or the like when moving through the water, and to assist in bringing about the peculiar movement of the bait as it is moved through the water in the manner hereinafter described. The secondary purpose of the beveled portion 5 is to cause the bait to more easily move through the water.

The conical body member 1 is provided at its narow end 6 with an eye 7 to which a fish hook 8 is attached, and with a second eye 9 intermediate the length of the body member on the underside thereof to which a double hook 10 is attached. Obviously, a treble hook may be placed on the eye 9 if it is desired to employ a treble or a single hook. Ordinarily, however, a double hook is best suited.

Line attaching eyes which I choose to distinguish as primary and secondary attaching eyes are fixed on the body member, the primary eye 11 being disposed on the upper portion of the body member adjacent the upper end of the truncated surface 2. The secondary line attaching eye 12 is disposed substantially in the center of the vertical flat wall 4 at the forward end of the body member 1.

A threaded pin 13 is fixed on the body member 1 on the underside thereof in front of the eye 9 midway between the eye 9 and the forward end 4 of the body member. A thumb nut 14 is disposed on the threaded pin 13 for a purpose hereinafter described. Ornamental shells 15 of aluminum are provided and are substantially conical in shape, as shown in Figure 2. These shells 15 are struck from a blank 16 as shown in Figure 5, and in that form are provided with an inwardly extending slot 17 adjacent the forward end thereof, the rear edge 18 being concave so that when the blank 16 is subsequently formed to the configuration shown in Figure 2, the rear edge 18 will be in a substantially single plane transverse to the axis of the shell 15. The opposite edges 19 and 20 are not brought into contact with one another, but are spaced apart to form a slot 21 extending longitudinally the entire length of the shell 15 and at the lower side thereof.

The outer surfaces of the shells 15 are colored and painted in a style peculiar to the various artificial baits. In Figure 2 I have shown a spotted shell in which the general color of the shell is white and upon which red spots 22 are painted. The shell 15 shown in Figure 3 is colored so as to have the appearance of longitudinally extending lines 23 of black and red, which colors blend into each other in a manner somewhat similar to the marking on a fish. Other of the shells 15 are merely polished aluminum, or they may be painted in a single color, each shell having a peculiar purpose, that is, to provide a bait that is similar to some particular bait known to be attractive to the fish' It is well to state at this time that the primary object is to provide an artificial bait that is capable of assuming the appearance of a great many fish by merely changing the shell or virtually disguising the body member in various disguises.

In fitting the shell 15 to the body member as shown in Figure 3, the slot 17 is disposed so as to receive the eye of the primary line attaching eye 11, and the slot 21 at the forward end thereof will receive the threaded pin 13. The shell 15 is then locked against displacement on the body member 1 by merely tightening the thumb nut 14 so as to bring the nut into close engagement with the shell.

From the foregoing description of the various parts of the device, the operation thereof may be readily understood. Let us assume that the fisherman has in his tackle box the body member 1 and a plurality of the shells 15, each one having a color and marking distinctive of some peculiar bait, and that he first tries his luck with the shell 15 shown in Figure 2. If the fish do not strike and it is found that this particular shell is possessed of the color and ornamental design that is not appealing to the fish, then he may manually loosen the thumb nut 14 and remove the conical shell from the body member 1 and substitute therefor any other of the various shells which he believes to be better suited for the particular grounds.

If the second shell is not found to be the proper one, he may again substitute the shell for another, etc., until he has found the shell which makes the bait the proper one for use. It is well recognized among fishermen that different colors of bait must be used at different times of the season, and also that the particular formation of the fishing ground, i. e., grass, sand, or rock bottom, has a direct bearing upon the color and ornamentation of the bait which may be most successfully used.

In placing the shells 15 in the tackle box, it will be noted that one shell will nest within the other, and therefore take up a minimum amount of space.

If it is desired to have an artificial bait which will imitate a minnow in diving and darting in a rapid movement through the water as the line is trolled or cast, the line is attached to the primary lead eye 11 at the upper portion of the bait. This will cause the bait to move through the water with an erratic movement due to the provision of the flat portions at the head of the body member 1, principally the flat portion 2. The beveled edges 5 aid at this time in bringing about certain erratic movement of the body member as it is drawn through the water.

If it is desired to have the bait merely move with a wiggling motion similar to the movement of a carp bait, then the line is attached to the secondary lead eye 12 which is disposed substantially along the axial line of the body member 1. The bait will then move with a slight wiggling motion but will not dive or dart to any great degree and therefore may perform well in the grounds where it is particularly weedy.

If the bait used is to be a surface bait, then the shell 15 must be light so that the specific gravity of the entire bait is small. If the bait is to be used for an under-water bait, then the shell 15 must be of a heavy metal so that the specific gravity of the entire bait will be relatively great.

In Figure 5 I have shown a modified form of my invention in which I provide wings 24 extending laterally on either side of the forward portion 25 of the shell 15 and in a plane tangent to that portion of the shell immediately surrounding the slot 17. These wings 24 somewhat simulate the fins of the fish and provide certain characteristic movement of the bait that is peculiar to certain fish and that is not found in the purely conical shell described in the preferred form of the device and shown in Figures 2 and 3. Characteristic markings, such as the spots 30, are printed upon the side walls of the shell 15 to make the bait more enticing.

It will be apparent that when the bait is retrieved or trolled that the surface 4 offers direct resistance to the water, and that the water rushing against this surface and slipping past the surfaces 2 and 5, together with the angular pull of the line from the primary attaching means 11, the presence of the ballast weight 13—14 and the conical-shaped rear portion, that the bait will perform its erratic stunts of darting from side to side, diving, and most important of all, will come to the surface with a splash and actually leap from the water and then dive again and dart from said to side, then to again "break water." This action of the bait is continued as long as the bait is being trolled. Of particular importance is the fact that the bait will come to the surface with a splash and then dive again, because this feature is altogether novel in artificial baits. This action could not be as effective if the surface 4 were eliminated and the plane 2 extending down to the bottom of the plug, thereby making the front of the bait just one inclined plane as is the case of the ordinary type of artificial bait.

Obviously my improved artificial bait may be constructed so that the body member may possess a tapering rear portion which may be oval or triangular in cross section, or which may possess any peculiar cross sectional contour. It is not necessary that the rear portion of the body member be conical, though the tapering conical contour is most preferable.

It should also be noticed that the particular construction of the head heretofore described may be varied to suit the taste and demand of the fisherman.

While the apparent primary purpose of the pin 13 and the thumb nut 14 is to secure the shell against movement on the body member, its secondary and very important function is that of the ballast weight. This weight on the under surface of the bait has a tendency to cause the bait to assume a certain definite position while in the water with the weight at the lowermost portion and thus more fully simulate the appearance of the fish.

I claim:—

1. An artificial bait of the type described comprising a tapering body portion, said body portion having its larger end fashioned with a substantially flat front surface perpendicular to the axis of the body portion, and a substantially flat inclined surface extending from the top edge of the front surface, and inclined upwardly so as to merge with the tapering surface of the body portion, said body portion being further provided with beveled surfaces at the three remaining edges of said flat front surface, said beveled surface being of greater pitch than said inclined surface, and of lesser area, and an eye for attaching a leader or the like secured to said flat front surface.

2. An artificial bait of the type described comprising a tapering body portion, said body portion having its larger end fashioned with a substantially flat front surface perpendicular to the axis of the body portion, and a substantially flat inclined surface extending from the top edge of the front surface, and inclined upwardly so as to merge with the tapering surface of the body portion, said body portion being further provided with beveled surfaces at the three remaining edges of said flat front surface, said beveled surface being of greater pitch than said inclined surface, and of lesser area, an eye for attaching a leader or the like secured to the tapered surface adjacent to the upper end of said inclined surface, and an eye for attaching a leader or the like secured to said flat front surface.

DREW HEAD.